United States Patent [19]
Tsang

[11] Patent Number: 6,002,358
[45] Date of Patent: Dec. 14, 1999

[54] METHOD AND APPARATUS FOR DETERMINING WHETHER TWO RADAR TRACKS REPRESENT THE SAME PHYSICAL OBJECT

[75] Inventor: Shiu Ming Tsang, Queens, N.Y.

[73] Assignee: Northrop Grumman Corporation, Los Angeles, Calif.

[21] Appl. No.: 09/135,745

[22] Filed: Aug. 18, 1998

[51] Int. Cl.$^6$ ............................................. G01S 13/66
[52] U.S. Cl. ..................... 342/195; 342/36; 342/59; 342/89; 342/189; 342/94; 342/95; 235/400; 235/411
[58] Field of Search .................... 342/26, 36, 175, 342/189, 195, 196, 197, 89, 90, 94, 95, 96, 97, 59; 235/400, 411, 412, 413; 348/169, 170, 171, 172; 382/103

[56] References Cited

U.S. PATENT DOCUMENTS

| | | | |
|---|---|---|---|
| 3,277,473 | 10/1966 | Calhoon, Sr. et al. | 342/195 |
| 3,399,404 | 8/1968 | Githens et al. | 342/90 |
| 4,845,500 | 7/1989 | Cornett et al. | 342/90 |
| 5,202,691 | 4/1993 | Hicks | 342/90 |
| 5,414,643 | 5/1995 | Blackman et al. | 342/95 X |

*Primary Examiner*—Bernarr E. Gregory

[57] ABSTRACT

An apparatus and computer-implemented method of determining a probability that a first track and a second track represent the same physical object. The apparatus and method fit a first order curve for a last n positions of the first track and the second track in a time domain; fit a second order curve for a last m (m>n) positions of the first track and the second track in the time domain; generate a maximum and minimum second order envelope for the first track and the second track, using a respective maximum acceleration of the first track and the second track; orthogonally place a probability curve over each of the first order curves for the first and second track, with each first order curve at a center of each probability curve for N sigmas extending to boundaries of each of the maximum and minimum second order envelopes; extract a first probability value from a point where the second order curve of the first track intersects the probability curve for the first track and a second probability value from a point where the second order curve of the second track intersects the probability curve for the first track; and determine the probability that the first track and the second track represent the same physical object from the first probability value and the second probability value.

16 Claims, 4 Drawing Sheets

METHOD AND APPARATUS FOR DETERMINING WHETHER TWO RADAR TRACKS REPRESENT THE SAME PHYSICAL OBJECT

BACKGROUND OF THE INVENTION

1. Field of the Invention

In general, the present invention relates to a computer-implemented method and apparatus for performing data fusion. In particular, when utilizing an active sensor, such as a radar, multiple radar tracks may be generated which represents the same physical object. The present invention relates to a computer-implemented method and apparatus for determining whether two or more radar tracks represent the same physical object.

2. Description of the Prior Art

There are several methods of integrating data from multiple radars into a single system track file. The type of radar integration that should be used is a function of the radar's performance, the environment, and whether or not the radars are colocated. Several conventional integration methods which have been used are:

1. Track selection: Generate a track with each radar, and choose one of the tracks as the system track.
2. Average track: Generate a track with each radar and weight, according to the Kalman filter's covariance matrices, the individual tracks to form a system track.
3. Augmented track: Generate a track with each radar, choose one of the tracks as the system track, and use selected detections from the other radars to update the system track.
4. Detection-to-track: Use all radar detections to update the system track; tracks may or may not be initiated by using all detections from all radars.

A prior art detection-to-track system is illustrated in FIG. 1. Radars 12 and 14, which include corresponding automatic detectors, provide inputs to a sensor input and control unit 16 which includes individual detection processors 18, 20. Each detection processor 18, 20 provides an input to a detection file 22, 24. The outputs from the detection files 22, 24 feed a data association integration circuit 26 which performs correlation of the track data received from the detection files 22, 24 and performs track entry and track update and writes the resulting outputs to a track file 28.

Theoretically, the detection-to-track method of integration yields the best tracks because all of the available information is used. However, the detections must be weighted properly and care must be taken so that bad data does not corrupt good data.

There are many advantages of radar integration. Probably the most important is that it provides a common surveillance picture to all users so that decisions can be made more effectively. Radar integration also improves track continuity and tracking of maneuvering targets because of the higher effective data rate. Improvement in track initiation times is a function of the target distance. For instance, long-range targets are usually detected by only one radar so that little or no improvement in initiation time is achieved. However, there could be an appreciable reduction in the initiation time for pop-up targets. Finally, the general tracking performance is improved in an electronic countermeasures (ECM) environment because of the integration of radars in different frequency bands located at different positions, providing both spatial and frequency diversity.

The main advantage of integrating different radar sensors is to provide classification and/or identification information on radar tracks. In general, other sensors do not provide position data of an accuracy comparable with radar data. The sensors can also alert each other to conditions which can cause the mode of operation to be changed. For instance, a strong direction-finding (DF) bearing strobe on a noise (jammer) source or emitter which cannot be correlated with any radar track may cause the radar to use burnthrough, lower its detection thresholds, or change its initiation criterion in the sector containing the DF bearing strobe.

As set forth above, radar integration has many advantages. However, most of the prior art methods relate to how to integrate two tracks, once it has been determined that integration is required. However, none of these methods actually determine when two tracks should be integrated because they represent the same physical object.

SUMMARY OF THE INVENTION

The present invention solves this problem by providing a method and apparatus for determining whether tracks from two or more sensors represent one unique physical object, so that one of the conventional integration methods may be implemented.

It is therefore, an object of the present invention to provide a method and apparatus which determines whether tracks from two or more sensors represent one physical object.

The method and apparatus of the present application achieve this object by relating first and second order curve fits where the tracks acceleration envelope in order to calculate the probability that two tracks are the same object. Multiple dimensions in the time domain enable the method and apparatus of the present application to improve incursion prediction ability as well as data fusion.

The present invention achieves this object by providing a computer-implemented method of determining a probability that a first track and a second track represent the same physical object, comprising the steps of a) fitting a first order curve for a last n positions of the first track and the second track in a time domain; b) fitting a second order curve for a last m (m>n) positions of the first track and the second track in the time domain; c) generating a maximum and minimum second order envelope for the first track and the second track, using a respective maximum acceleration of the first track and the second track; d) orthogonally placing a probability curve over each of the first order curves for the first and second track with each first order curve at a center of each probability curve for N sigmas extending to boundaries of each of the maximum and minimum second order envelopes; e) extracting a first probability value from a point where the second order curve of the first track intersects the probability curve for the first track and a second probability value from a point where the second order curve of the second track intersects the probability curve for the first track; and f) determining the probability that the first track and the second track represent the same physical object from the first probability value and the second probability value.

BRIEF DESCRIPTION OF THE DRAWING

The present invention will become more fully understood from the detailed description given hereinbelow and the accompanying drawings which are given by way of illustration only, and thus are not limitative of the present invention, and wherein.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENT

Figure 1:
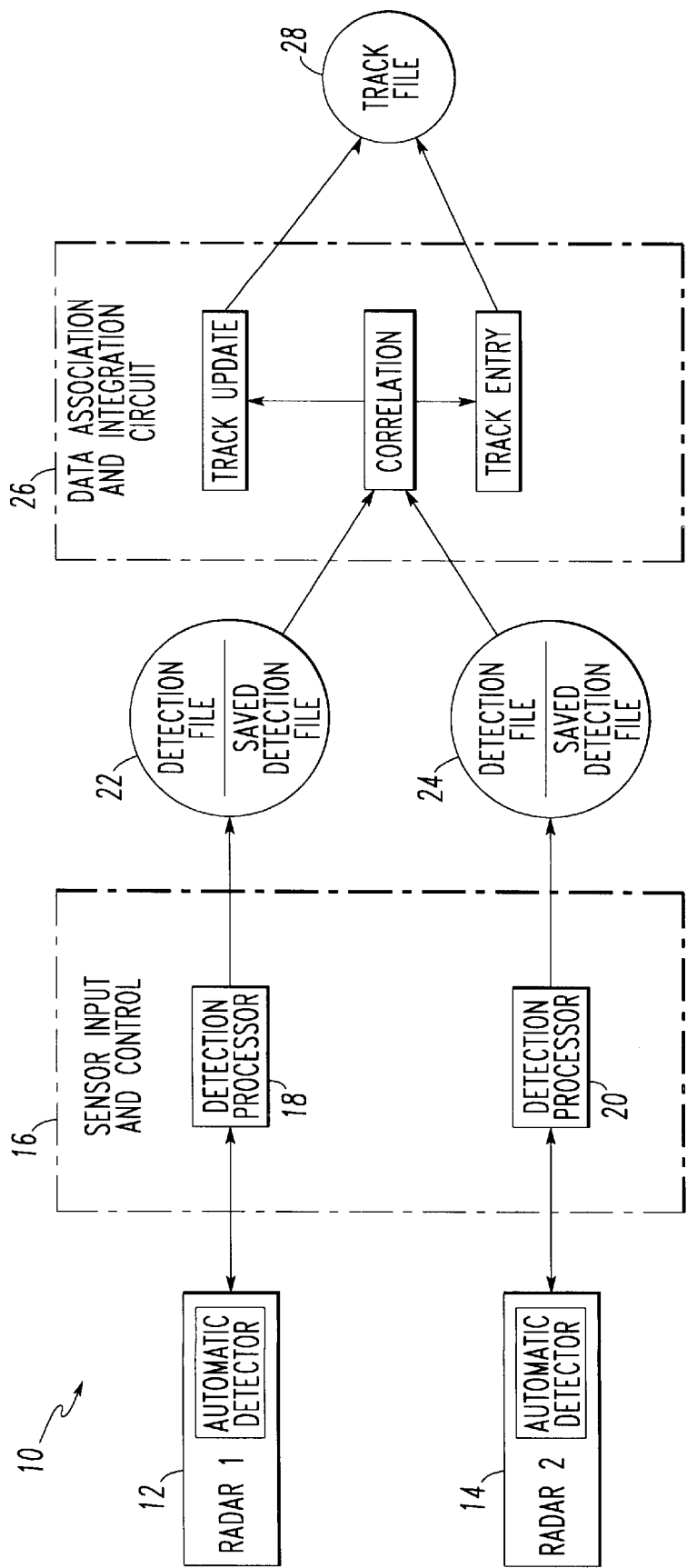
FIG. 1 illustrates a conventional detection-two-track system which integrates two radar tracks.
Figure 2:
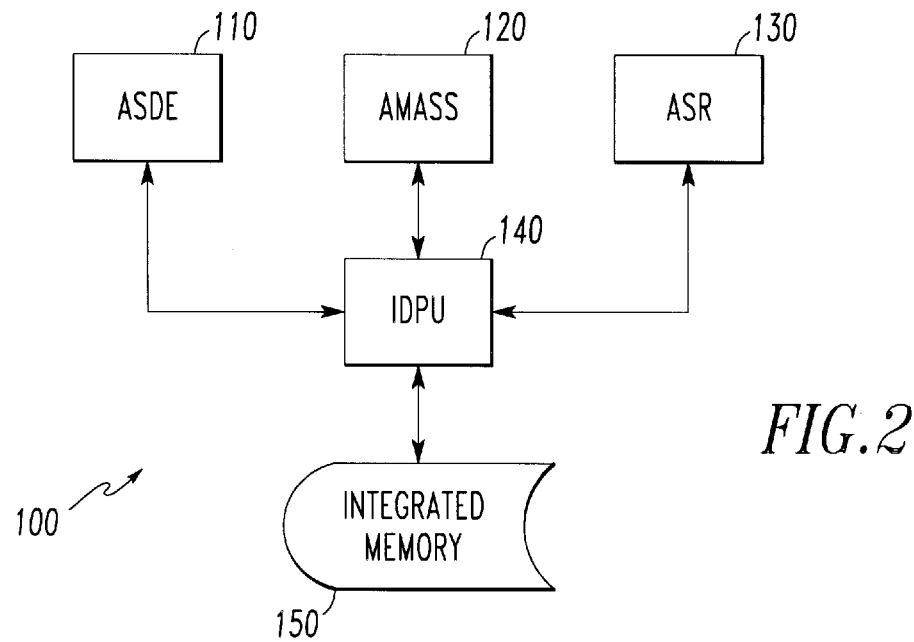
FIG. 2 illustrates an integrated air traffic control suite into which one embodiment of the present invention is implemented.

FIG. 2 illustrates an integrated air traffic control suite 100, into which one embodiment of the present invention is implemented. The air traffic control suite 100 includes an Airport Surface Detection Equipment (ASDE) suite 110, which is a ground surface radar system for detecting airplanes and other airport vehicles on the ground. The integrated air traffic control suite 100 also includes an Airport Movement Area Safety System (AMASS) 120 which receives ASDE 110 radar inputs and identifies targets in order to predict incursions and/or accidents. Finally, the integrated air traffic control suite 100 includes the Airport surveillance radar (ASR) 130 system which is a radar system for "approaching" aircraft.

The integrated air traffic control suite 100 further includes an Incursion and Display Processing Unit (IDPU) 140 which integrates the ASDE 110, AMASS 120, and ASR 130 data in an integrated memory 150 and produces airport displays, which include airplanes represented as icons, tracks, and lines and tags which include identifying information for each aircraft.

Figure 3:
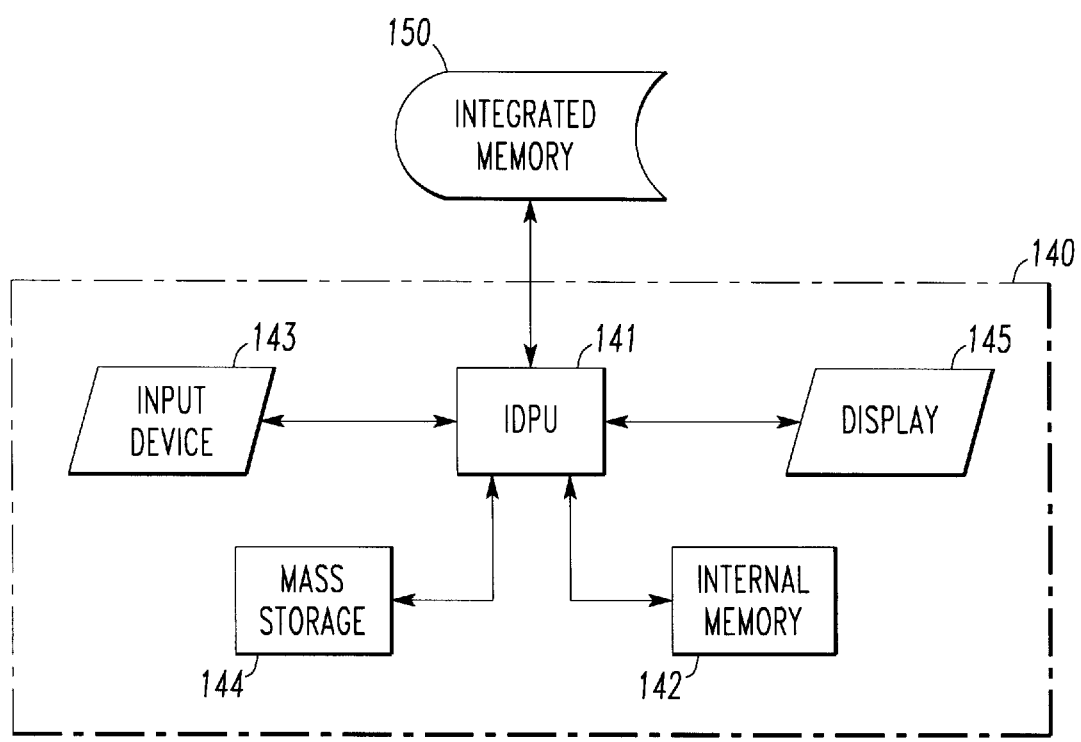
FIG. 3 illustrates a preferred embodiment of the present invention.

The functions of the apparatus and method of the present invention are performed by the IDPU 140, which is illustrated in further detail in FIG. 3. The IDPU 140 includes an incursion and display processor (IDP) 141, internal memory 142, an input device 143, a mass storage 144, and a display 145.

The IDP 141 maintains a track data base from numerous sensors in integrated memory 50. The IDP 141 picks one or more tracks from the integrated memory 150 and performs the following steps, in order to determine whether the two or more tracks represents one unique physical object.

Figure 4:
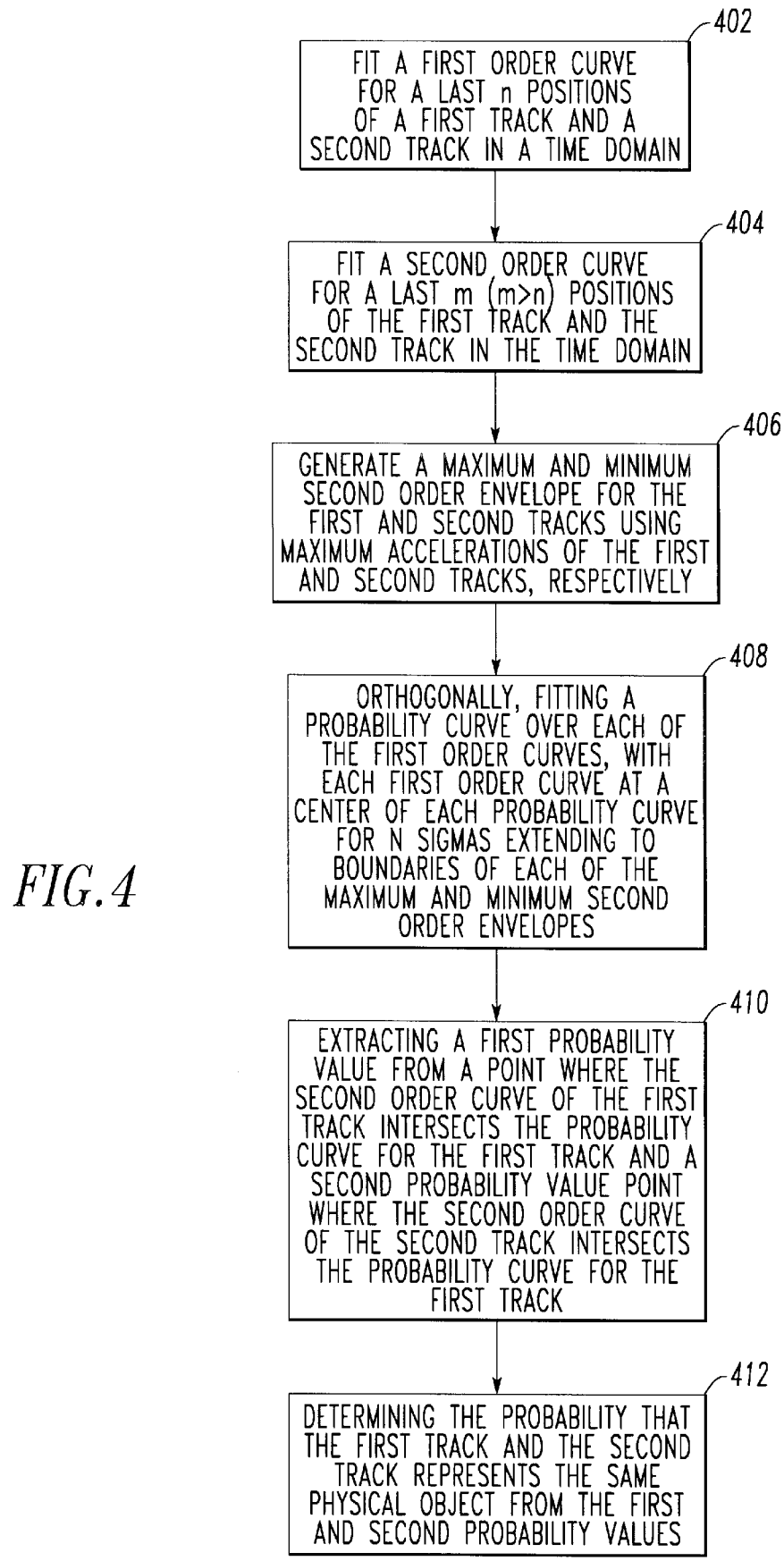
FIG. 4 is a flow chart illustrating the steps performed in the preferred embodiment of the present invention.
Figure 5:
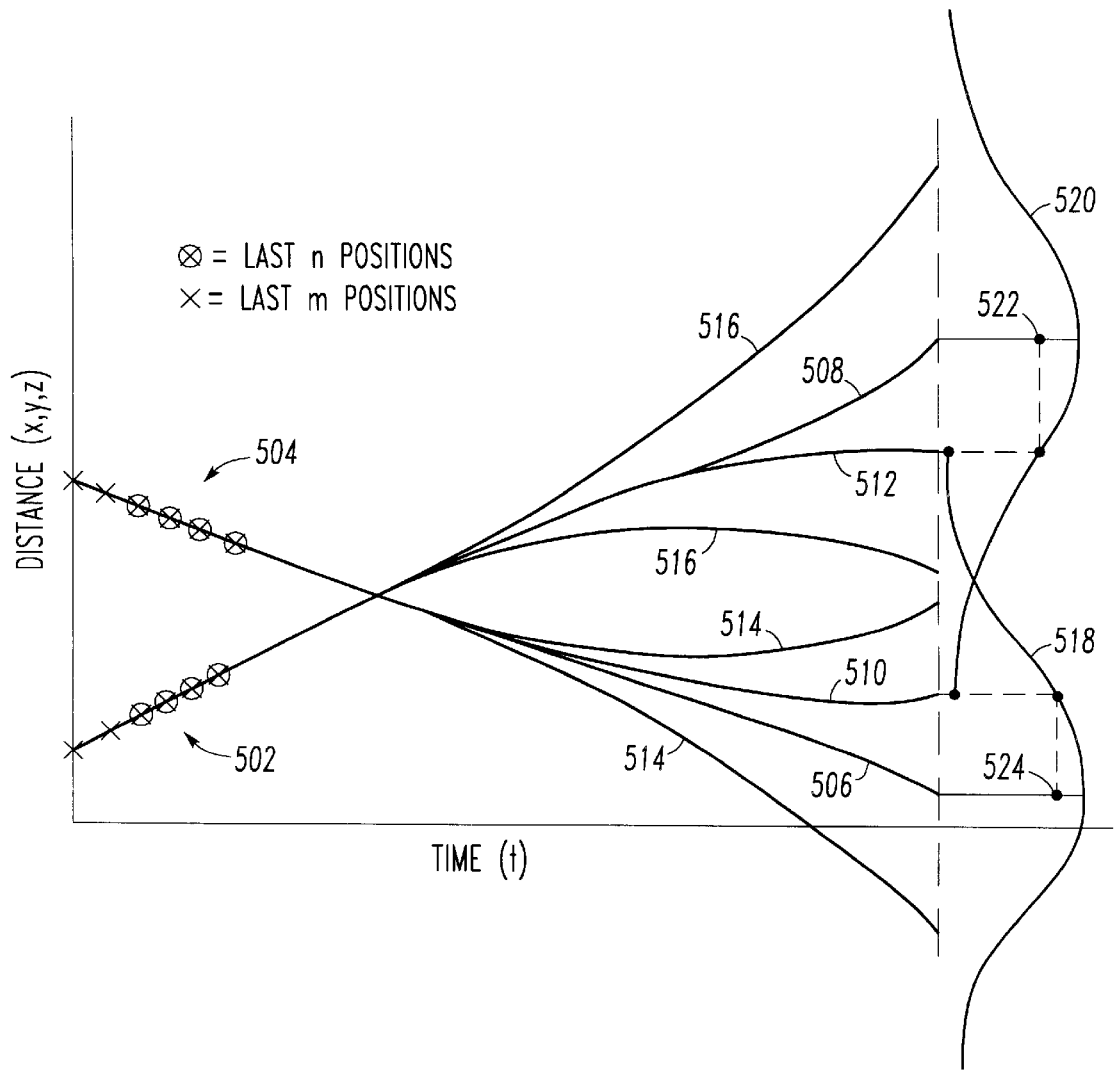
FIG. 5 provides a pictorial representation of how the method and apparatus of the present application operate in a preferred embodiment.

The operations performed by the IDP 141 will be described below in conjunction with the flow chart illustrated in FIG. 4 and the graph illustrated in FIG. 5.

First, the IDP 141 fits a first order curve 506, 508 for a last n positions of a first track and a second track in a time domain (step 402). Illustrated graphically in FIG. 5, n positions (where n=4) for a first track 502 and a second track 504 are plotted in a distance (x, y, z,) versus time plane. Next, the IDP 141 fits a second order curve 510, 512 for a last m positions (where m=6) of the first track 502 and the second track 504 in the time domain (step 404). Then the IDP 141 generates a maximum and minimum second order envelope 514, 516 for the first and second tracks 502, 504 using maximum accelerations of the first and second tracks, respectively (step 406). The IDP 141 then orthogonally fits a probability curve 518, 520 over each of the first order curves 506, 508, with each first order curve 506, 508 at a center of each probability curve 518, 520 for N sigmas extending to boundaries of each of the maximum and minimum second order envelopes 514, 516 (step 408). The IDP 141 then extracts a first probability value 522 from a point where the second order curve 512 of the first track intersects the probability curve 520 for the first track and a second probability value 524 from a point where the second order curve 510 of the second track intersects the probability curve 518 for the first track (step 410). Finally, the IDP 141 determines the probability that the first track and the second track represents the same physical object from the first and second probability values (step 412).

Steps 402–412 are repeated for each pair of tracks and the product of the first and second probability values 522 and 524 of a pair of tracks in the immediate future is the threshold for fusion. This product is also the probability of an incursion between the two tracks 502, 504.

As set forth above, the apparatus and method of the present application has immediate applicability to a multi-sensor environment, such as the IDPU, in order to improve the IDPU's ability to perform target profiling, data fusion, and early warning of incursions.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A computer-implemented method of determining a probability that a first track and a second track represent the same physical object, comprising the steps of:

a) fitting a first order curve for a last n positions of the first track and the second track in a time domain;

b) fitting a second order curve for a last m (m>n) positions of the first track and the second track in the time domain;

c) generating a maximum and minimum second order envelope for the first track and the second track, using a respective maximum acceleration of the first track and the second track;

d) orthogonally fitting a probability curve over each of the first order curves for the first and second track, with each first order curve at a center of each probability curve;

e) extracting a first probability value from a point where the second order curve of the first track intersects the probability curve for the first track and a second probability value from a point where the second order curve of the second track intersects the probability curve for the first track; and f) determining the probability that the first track and the second track represent the same physical object from the first probability value and the second probability value.

2. The computer-implemented method of claim 1, wherein said step e), a third probability value from a point where the second order curve of the first track intersects the probability curve for the second track and a fourth probability value from a point where the second order curve of the second track intersects the probability curve for the second track are also extracted and said step f) determines the probability that the first track and the second track represent the same physical object from the first through fourth probability values.

3. The computer-implemented method of claim 2, wherein said step f) determines the probability that the first track and the second track represent the same physical object from a product of the first through fourth probability values.

4. The computer-implemented method of claim 1, wherein said step f) determines the probability that the first track and the second track represent the same physical object from a product of the first probability value and the second probability value.

5. The computer-implemented method of claim 1, wherein n=4.

6. The computer-implemented method of claim 1, wherein m=6.

7. The computer-implemented method of claim 1, wherein said method is utilized in an air traffic control environment.

8. The computer-implemented method of claim 1, wherein the first track and the second track originate from two different sensors.

9. An apparatus for determining a probability that a first track and a second track represent the same physical object, comprising:

a processor for fitting a first order curve for a last n positions of the first track and the second track in a time domain;

fitting a second order curve for a last m (m>n) positions of the first track and the second track in the time domain;

generating a maximum and minimum second order envelope for the first track and the second track, using a respective maximum acceleration of the first track and the second track;

orthogonally fitting a probability curve over each of the first order curves for the first and second track with each first order curve at a center of each probability curve;

extracting a first probability value from a point where the second order curve of the first track intersects the probability curve for the first track and a second probability value from a point where the second order curve of the second track intersects the probability curve for the first track; and determining the probability that the first track and the second track represent the same physical object from the first probability value and the second probability value.

10. The apparatus of claim 9, wherein said processor extracts a third probability value from a point where the second order curve of the first track intersects the probability curve for the second track, extracts a fourth probability value from a point where the second order curve of the second track intersects the probability curve for the second track, and determines the probability that the first track and the second track represent the same physical object from the first through fourth probability values.

11. The apparatus of claim 10, wherein said processor determines the probability that the first track and the second track represent the same physical object from a product of the first through fourth probability values.

12. The apparatus of claim 9, wherein said processor determines the probability that the first track and the second track represent the same physical object from a product of the first probability value and the second probability value.

13. The apparatus of claim 9, wherein n=4.

14. The apparatus of claim 9, wherein m=6.

15. The apparatus of claim 9, wherein said apparatus is utilized in an air traffic control environment.

16. The apparatus of claim 9, wherein the first track and the second track originate from two different sensors.

* * * * *